Sept. 15, 1964   R. T. BOARDMAN ETAL   3,148,674
AIR CIRCULATING OVEN
Filed June 24, 1963   3 Sheets-Sheet 1
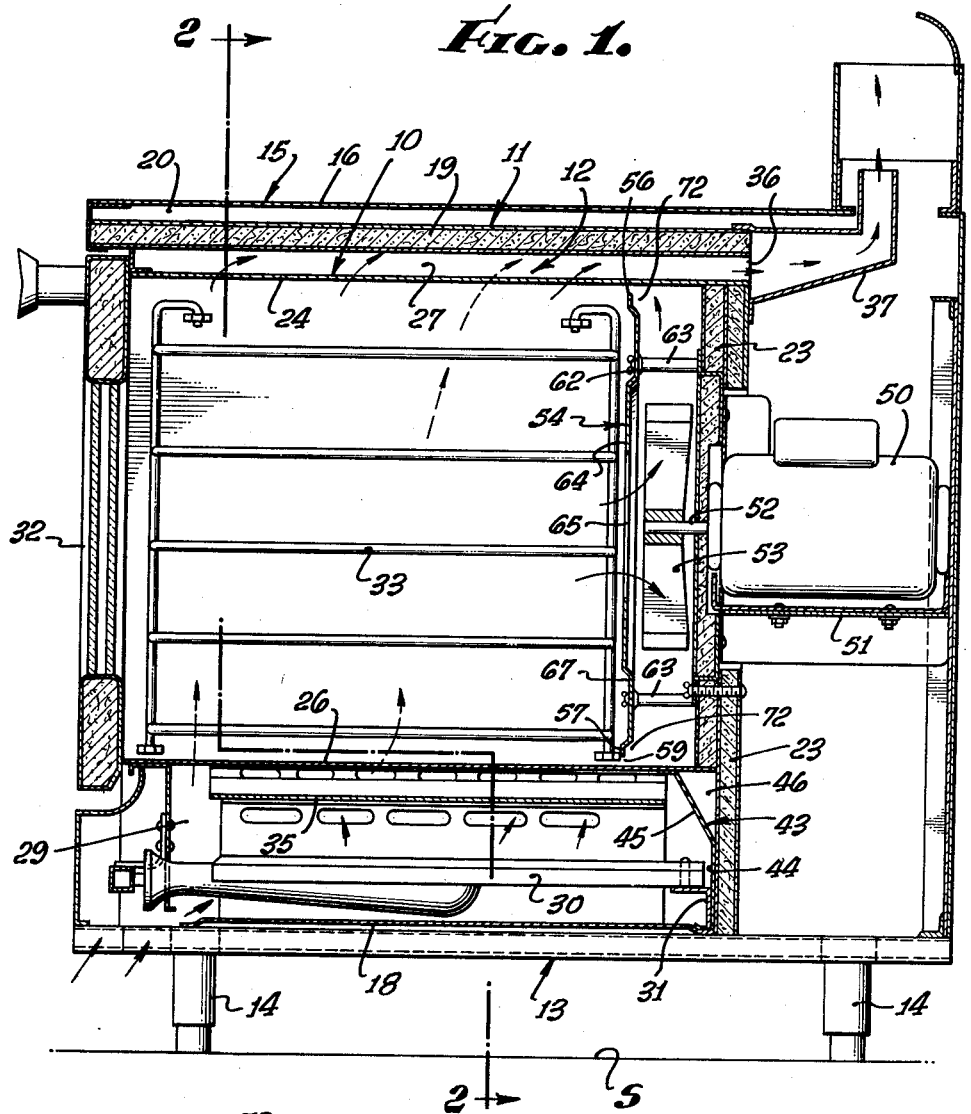
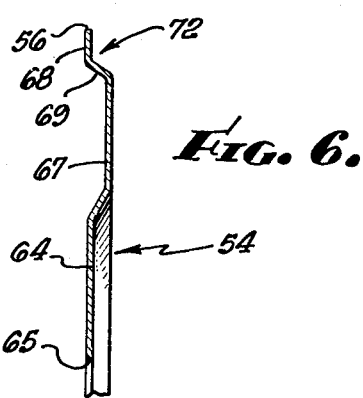
RUSSELL T. BOARDMAN
HOWARD C. FAUTZ
    INVENTORS.
BY
   Bernard Kriegel
         ATTORNEY.

Sept. 15, 1964   R. T. BOARDMAN ETAL   3,148,674
AIR CIRCULATING OVEN
Filed June 24, 1963   3 Sheets-Sheet 2

RUSSELL T. BOARDMAN
HOWARD C. FAUTZ
INVENTORS.

BY
Bernard Kriegel
ATTORNEY.

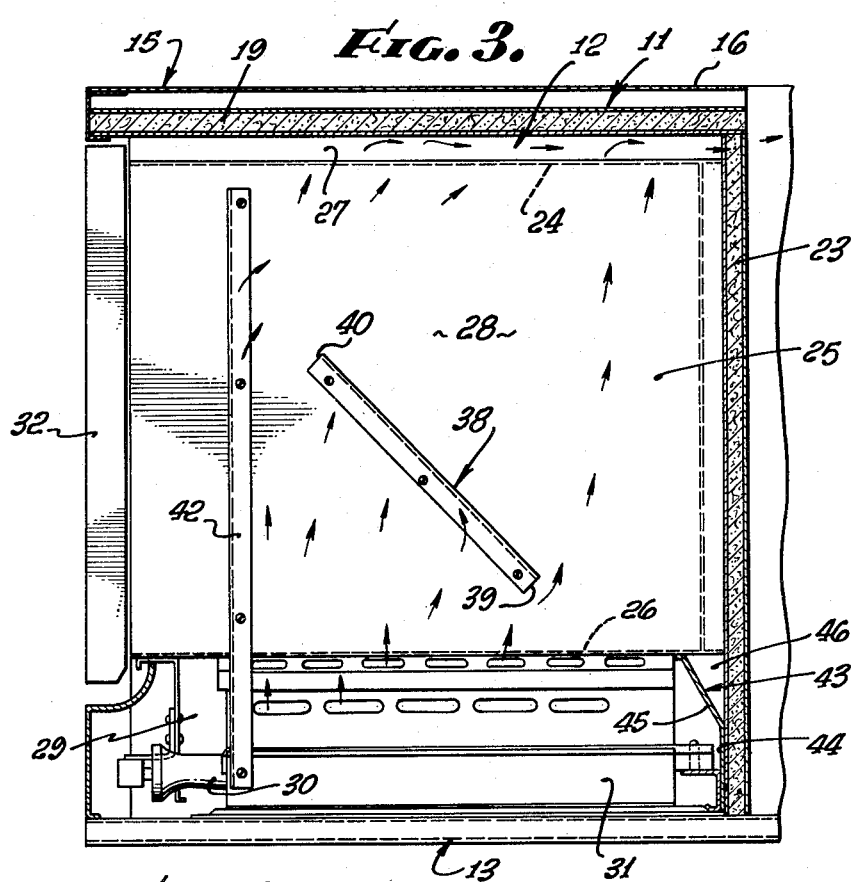

United States Patent Office 3,148,674
Patented Sept. 15, 1964

3,148,674
AIR CIRCULATING OVEN
Russell T. Boardman, San Marino, and Howard C. Fautz, Long Beach, Calif., assignors to Wolf Range Corporation, Compton, Calif., a corporation of California
Filed June 24, 1963, Ser. No. 290,085
16 Claims. (Cl. 126—19)

The present invention relates to apparatus for cooking food products, and more particularly to roasting and baking ovens.

An object of the present invention is to provide a baking oven in which the desired cooking temperature can be maintained more uniformly throughout the entire space of the cooking chamber.

Another object of the invention is to provide a roasting and baking oven, in which hot air is circulated through the oven for heating the food products therein, the circulating air being given increased turbulence during its flow into the oven chamber to secure a more uniform temperature throughout the oven and the production of more uniformly baked or roasted food products, regardless of the specific locations of such products in the oven chamber.

A further object of the invention is to provide a roasting and baking oven apparatus having a closed oven chamber surrounded by a heating chamber through which the products of combustion from burners flow and transfer heat through the walls of the oven chamber to the air therewithin, the passage of the combustion products or gases through the heating chamber being controlled in such manner as to insure more efficient transfer of heat through the oven walls to the interior of the oven chamber, aiding in the obtaining of a more uniform temperature within the oven chamber.

An additional object of the invention is to provide a roasting and baking oven apparatus having a closed oven chamber surrounded by a heating chamber through which the products of combustion from burners flow and transfer heat through the walls of the oven chamber to the air therewithin, in which a motor driven blower, or the like, is employed for recirculating hot air through the oven chamber, the transfer of substantial heat from the products of combustion to the blower motor being minimized so that the motor temperature is maintained at a low, safe value, thereby greatly increasing its useful life.

Yet another object of the invention is to provide a roasting and baking oven apparatus having a closed oven chamber surrounded by a heating chamber through which the products of combustion from burners flow and transfer heat through the walls of the oven chamber to the air therewithin, in which a motor driven blower is employed for circulating air through the oven chamber in cooperation with a baffle device that is so constructed and related to the walls of the oven chamber as to secure uniformity of temperature throughout the oven chamber and uniformity in the baking or roasting of the food products dispersed within the oven chamber.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a vertical section through an oven embodying the invention;

FIG. 3 is a section taken along the line 3—3 on FIG. 2;

FIG. 4 is an enlarged fragmentary section taken generally along the line 4—4 on FIG. 2;

FIG. 5 is an isometric projection of a baffle plate or structure embodied in the oven chamber;

FIG. 6 is an enlarged fragmentary section taken along the line 6—6 of FIG. 2.

Figure 2:
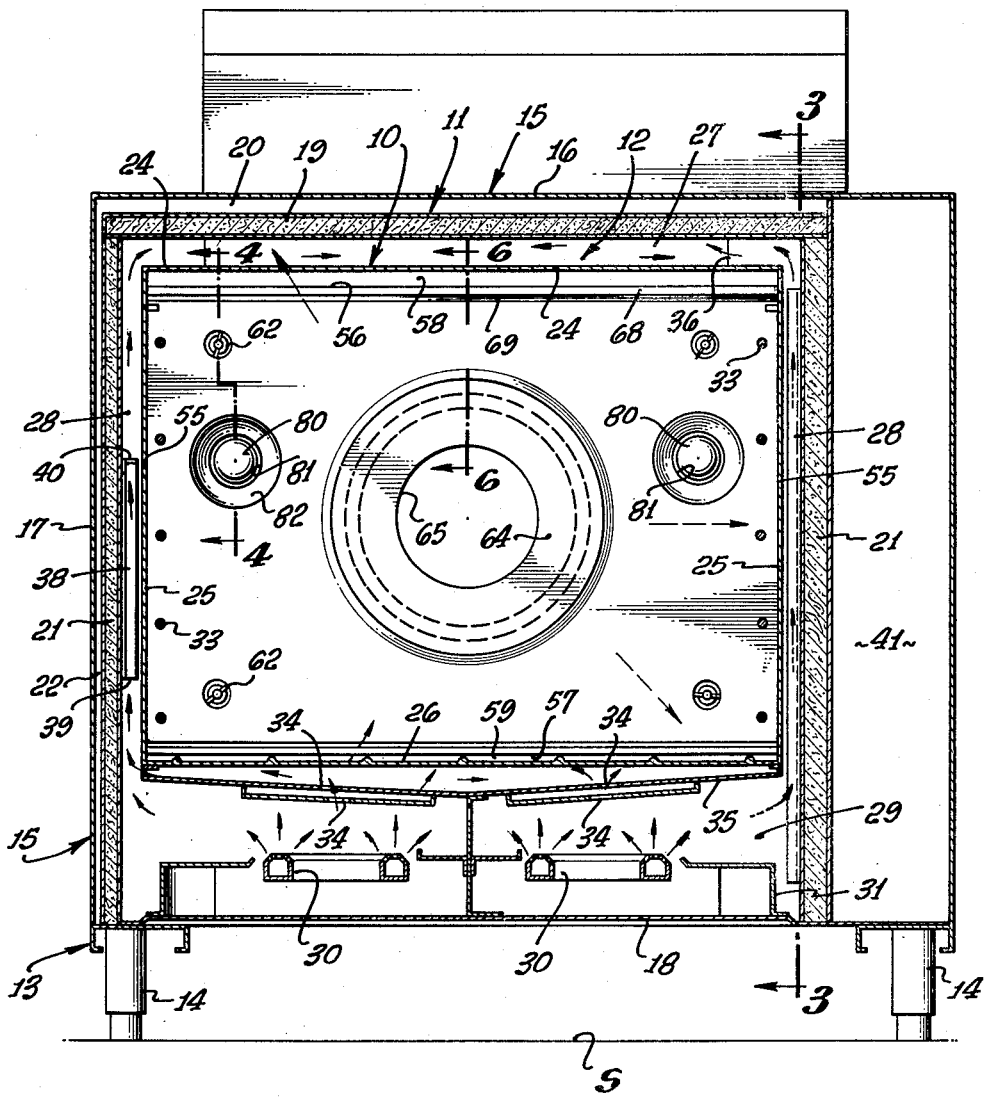
FIG. 2 is a cross-section through the oven taken generally along the line 2—2 on FIG. 1.

A roasting and baking oven is illustrated in the drawings, including an inner tank or oven chamber 10 surrounded by an outer insulated housing 11 which is in spaced relation thereto along its side and top portions to provide a heating chamber or jacket 12 through which products of combustion are adapted to pass for the purpose of conducting heat through the walls of the oven chamber to the air therewithin. The products of combustion are separate from and do not commingle with the air within the oven chamber 10, such air being recirculated within the chamber in a manner to obtain uniform temperature throughout the oven chamber space, insuring uniformity in the baking or roasting of the products within the oven.

As shown, the outer housing 11 includes a suitable frame structure 13 that can be supported on a desired supporting surface S by legs 14. Carried by the frame or structure 13 is an outer shell 15, including a top 16, vertical sides 17, and a bottom 18. A top insulated oven panel 19 is suitably supported in spaced relation to the top panel 16 to provide a cool air insulating pocket 20 therebetween. In similar fashion, insulated side panels 21 are provided, spaced from the sides 17 of the outermost enclosure, to provide insulating cool air insulated pockets 22 therebetween. A rear panel structure 23 of insulating material is suitably supported by the frame 13, the insulated side panels 21 and rear panel structure 23 extending from the bottom 18 of the oven apparatus to the top insulating panel 19.

Mounted within the heating chamber 11 formed by the insulating panels 19, 21, 23 is the inner tank or oven chamber 10, consisting of a top wall 24, side walls 25, and a bottom wall 26. The top wall 24 is disposed below the insulating panel 19, providing an upper heating space 27 therebetween, whereas, the side walls 25 are spaced inwardly from the adjacent insulated side panels 21 to provide a space 28 therebetween, such side spaces 28 communicating with the top space 27 and also with a lower space 29 between the bottom 18 of the oven chamber and the bottom 26 of the oven enclosure, which constitutes a combustion chamber containing gas burners 30 suitably supported on a bracket structure or frame 31 within the chamber. The front of the inner tank or oven chamber 10 is closed by an oven door 32 suitably pivoted to the oven structure 13, as at the lower end of the door, so as to be movable to open and closed positions. Also suitably mounted within the oven chamber 10 are side racks 33 for the reception of pans (not shown), or the like, on which the food products to be roasted or baked can be placed.

The products of combustion or gases from the burners 30 pass upwardly therefrom and through perforations 34 in false bottoms 35 for action upon the bottom 26 of the oven chamber. Such products of combustion also pass through the combustion chamber 29 toward the sides 21 of the heating chamber, flowing upwardly through the jacket spaces 28 between the insulated side panels 21 and the oven chamber sides 25 and into the top, horizontal space 27 between the top 24 of the oven chamber and the top insulated panel 19, the products of combustion then passing into an elongate opening 36 in the rear insulated panel structure 23 of the oven into a vent or flue box 37, for suitable discharge to the atmosphere. During their passage over the outer surfaces of the bottom 26, sides 25 and top 24 of the oven chamber 10, the latter are heated and heat is transmitted to the air within the oven chamber. To insure proper and substantially uniform flow of the products of combustion or gases along the outer sides 25 of the oven chamber and over its top 24, inclined side wall baffles 38 are secured to the insulated side panels 21, being disposed within the side portions 28 of the heating chamber.

Each baffle 38 is inclined in an upward and forward direction. Its lower end 39 is disposed forwardly of the rear panel or wall 23 of the heating chamber and above the bottom wall 26 of the oven chamber, the upper end 40 of the baffle terminating a substantial distance rearwardly of the forward ends of the sides 25 of the oven chamber and substantially below the top 24 of the oven chamber. Because of the presence of the inclined baffle 38 on each side of the oven chamber 10, the products of combustion will pass upwardly into each side portion 28 of the heating jacket and a part thereof will flow toward the rear of the oven, passing upwardly between the rear end 39 of the baffle and the rear wall 23 of the oven along the sides 25. The inclined baffle will direct another substantial part of the products of combustion upwardly and toward the front of the oven along the side wall 25 of the oven, such products of combustion then tending to continue flowing upwardly toward the top 24 of the oven and also toward its rear, as indicated by the arrows in FIG. 3, then flowing into the upper portion 27 of the heating chamber and along a substantial surface of the top 24 of the oven chamber. As stated above, the products of combustion flow from the upper heating chamber 27 into the flue 37.

The arrangement of the inclined baffles 38 insures a more uniform dispersion of the products of combustion along the side walls 25 of the oven chamber 10 from their lower ends to their upper ends, as well as a more uniform dispersion of the products of combustion over the upper or top wall 24 of the oven chamber, thereby insuring against localizing or concentrations of heat along the side walls 25 and the top wall 24. In the absence of the baffles, the products of combustion would tend to pursue a more direct path toward the flue 37, resulting in a concentration of heat along the rear of the side walls and the rear of the top wall, the forward portions of the side walls and the top wall being subject to the heating effect of a much smaller quantity of the products of combustion.

At one side of the oven, a forward section 41 is provided for containing suitable oven control mechanisms (not disclosed). To protect such mechanisms from the products of combustion, a vertical baffle 42 is mounted in the heating jacket space 28 adjacent to such side of the oven and at the forward portion of the jacket to prevent the products of combustion from passing to the front portion of the insulated side panel 21, thereby minimizing the heating effect of such front portion and insuring the retention of the control devices at a relatively low temperature.

To prevent the products of combustion from inordinately heating the rear portion or panel structure 23 of the oven, a rear baffle 43 is mounted adjacent to and forwardly of such rear panel, the lower part 44 of this rear baffle being vertical and its upper portion 45 being inclined in an upward and forward direction extending to the bottom 26 of the oven chamber 10. The products of combustion, striking the inclined rear baffle portion 45, will be deflected toward the front of the oven, or away from the rear panel 23. In addition, an air space 46 is located between the inclined portion 45 of the rear baffle and the insulated rear panel 23 to minimize the transfer of heat to the latter, as well as to the bottom 26 of the oven rearwardly of the baffle 43.

Air is caused to flow in a closed circuit within the oven chamber 10 itself, such air contacting the sides 25, bottom 26 and top 24 of the oven chamber to absorb heat therefrom, and then passing over the food products within the oven chamber for the purpose of cooking the same. A blower or centrifugal impeller device is mounted at the rear of the oven apparatus. As disclosed in FIG. 1, an electric motor 50 is suitably supported on a bracket 51 behind the rear insulated panel structure 23 and substantially centrally of the axis of the oven chamber, the motor shaft 52 extending through the panel to the interior of the oven chamber 10. A blower or impeller member 53 is suitably secured to this shaft, the blower being of the type to draw air into its inner portion and discharge such air radially outwardly thereof. The impeller 53 is located adjacent to the rear wall 23 of the oven chamber and immediately behind a baffle plate 54 at the rear of the oven racks 33, this baffle plate extending fully across the width of the oven chamber between its side walls 25, the side edges 55 of the baffle plate contacting the side walls themselves to prevent air from passing therebetween. However, the upper and lower edges 56, 57 of the baffle plate are spaced from the top and bottom walls 24, 26, respectively, of the oven chamber 10 to form discharge passages 58, 59 for the air directed outwardly of the blower 53.

The baffle plate 54 is supported in the rear portion of the oven chamber 10 by spaced studs 60 suitably secured to the rear wall 23, such studs extending through inwardly directed embossments 61 in the baffle plate, wing nuts 62 located in the embossments being suitably tightened on the studs to press the embossments against spacer sleeves 63 surrounding the studs, the rear ends of which engage the rear oven wall. The spaced studs 60, spacer sleeves 63 and nuts 62 serve to removably support the baffle plate 54 in the oven chamber, with the side edges 55 of the baffle plate contiguous the oven sides 25 and with the upper and lower edges 56, 57 of the baffle plate spaced the desired distances from the top and bottom walls 24, 26 of the oven.

To illuminate the interior of the oven chamber 10, electric lights 80 may extend through openings 81 in embossments 82 in the plate 54, such lights being removably secured in sockets 83 suitably mounted in the rear panel 23.

The baffle plate is also supported close to the blower or impeller 53. The central portion of the baffle plate is provided with a forwardly directed embossment or offset 64, thereby allowing closer placing of the periphery of the blower 53 to the baffle plate, with assurance that distortions in the baffle plate due to temperature changes will not cause the rotating blower to engage any part thereof. The central offset 64 has a central inlet opening 65 through which the air in the oven chamber is drawn into the central portion of the impeller 53, which will then centrifugally force it outwardly toward the top, bottom and side walls 24, 26, 25 of the oven chamber 10. The air cannot pass around the side edges 55 of the baffle plate, but only over its upper and lower edges 56, 57. In passing over such upper and lower edges, substantial turbulence is imparted to the air, insuring its thorough mixing and widespread distribution upon blowing into the oven chamber, the air passing in a turbulent fashion toward the front of the oven and along its bottom and top walls 26, 24, as well as along its side walls 25, then being drawn back through the central opening 65 into the blower for discharge outwardly therefrom and repassage through the upper and lower spaces 58, 59 between the baffle 54 and the top and bottom walls 24, 26 of the oven chamber.

It is found that an increase in air turbulence and of uniformity in the temperature throughout the oven chamber is achieved by offsetting the top and bottom portions of the baffle plate 54 from its main body portion 67. Thus, the baffle plate has an upper flange 68 offset in a forward direction from the main plane or body 67 of the baffle, the offset flange being interconnected with the main portion of the body by an intervening rib 69 inclined in an upward direction forwardly of the oven chamber. Similarly, the baffle plate has a lower flange 70 offset from its main body 67 through the agency of a lower rib 71 that is inclined downwardly in a direction forwardly of the oven chamber. It is found that the offsetting of the upper and lower flanges 68, 70 in a forward direction from the main body 67 of the baffle increases the amount of turbulence of the air discharged from the blower, turbulence occurring in flow of the air into the spaces 72 between the inclined ribs 69, 71 and the top and bottom walls 24, 26, which turbulence is further increased in passage of the air around the upper and lower flange edges 56, 57 and through the upper and lower spaces 58, 59 between such flanges and the top and bottom walls 24, 26.

Actual operation of ovens with the baffle construction and arrangement illustrated in the drawings on a large variety of food products has demonstrated that a uniform baking throughout the oven chamber is secured. Particularly, the preventing of the air discharged from the blower 53 from passing around the sides 55 of the baffle, and causing such air to flow only around the top and bottom edges 56, 57 of the baffle, eliminated the burning of some baked goods. Such burning occurred when air was permitted to flow around the side edges 55 of the baffle, as well as around its top and bottom edges 56, 57. The offsetting of the upper and lower baffle flanges 68, 70 in a forward direction also was found to contribute to a more uniform heating of baked goods in the oven chamber. This is thought to be due to the obtaining of an increased turbulence in the air flow around the top and bottom portions of the baffle that such offsetting produces.

Uniform backing of the goods or products in the oven is also enhanced by preventing the products of combustion from passing through any heating chamber along the rear wall 23 of the oven chamber. It is to be noted that the products of combustion pass only over the bottom, sides and top walls 26, 25, 24 of the oven chamber, and not upwardly along the rear wall 23. The elimination of this latter heating chamber space not only contributes to the securing of uniform baking and roasting within the oven chamber, but it also prevents the products of combustion from flowing along a path adjacent to the electric motor 50. As shown in FIG. 1, the electric motor is mounted behind the rear insulating panel 23, and the rear baffle 43 in the combustion chamber directs the products of combustion upwardly away from this panel, allowing such rear panel to remain at a lower temperature. Essentially, the rear panel or rear wall 23 of the oven chamber is subject only to the temperature of the air being circulated within the oven chamber 10. Better heat distribution throughout the entire oven structure is also due to the positioning of the inclined side baffles 38 within the side portions 28 of the heating jacket or heating chamber 12.

We claim:

1. In a roasting and baking oven for food products: a closed oven chamber including top, bottom, side and rear walls; a heating chamber spaced from said top, bottom and side walls, said heating chamber including a combustion chamber below said bottom wall having heating means therein; means for preventing heated gases from said combustion chamber from flowing along all portions of said rear wall; an impeller within said oven chamber adjacent to said rear wall; means externally of said rear wall coupled to said impeller to rotate the same; a baffle plate adjacent to and forwardly of said impeller and having side portions in closed relation to said side walls, said baffle plate having top and bottom edges spaced from said top and bottom walls, respectively, said plate having a central opening through which air is pulled rearwardly from said oven chamber by said impeller and discharged outwardly by said impeller between said baffle plate and rear wall for return passage around the top and bottom edges of said baffle plate forwardly into said oven chamber.

2. In a roasting and baking oven for food products: a closed oven chamber including top, bottom, side and rear walls; a heating chamber spaced from said top, bottom and side walls, said heating chamber including a combustion chamber below said bottom wall having heating means therein; an impeller within said oven chamber adjacent to said rear wall; means externally of said rear wall coupled to said impeller to rotate the same; a baffle plate adjacent to and forwardly of said impeller and having side portions in closed relation to said side walls, said baffle plate having top and bottom edges spaced from said top and bottom walls, respectively, said plate having a central opening through which air is pulled rearwardly from said oven chamber by said impeller and discharged outwardly by said impeller between said baffle plate and rear wall for return passage around the top and bottom edges of said baffle plate forwardly of said oven chamber.

3. In a roasting and baking oven for food products: a closed oven chamber including top, bottom, side and rear walls; a heating chamber spaced from said top, bottom and side walls, said heating chamber including a combustion chamber below said bottom wall having heating means therein; means for preventing heated gases from said combustion chamber from flowing along all portions of said rear wall; an impeller within said oven chamber adjacent to said rear wall; means externally of said rear wall coupled to said impeller to rotate the same; a baffle plate adjacent to and forwardly of said impeller and having side portions in closed relation to said side walls, said baffle plate having top and bottom vertical flanges offset forwardly from the main body portion of said plate, said top flange having an upper edge spaced from said top wall and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber.

4. In a roasting and baking oven for food products: a closed oven chamber including top, bottom, side and rear walls; a heating chamber spaced from said top, bottom and side walls, said heating chamber including a combustion chamber below said bottom wall having heating means therein; an impeller within said oven chamber adjacent to said rear wall; means externally of said rear wall coupled to said impeller to rotate the same; a baffle plate adjacent to and forwardly of said impeller and having side portions in closed relation to said side walls, said baffle plate having top and bottom vertical flanges offset forwardly from the main body portion of said plate, said top flange having an upper edge spaced from said top wall and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber.

5. In a roasting and baking oven for food products: a closed oven chamber including top, bottom, side and rear walls; a heating chamber spaced from said top, bottom and side walls, said heating chamber including a combustion chamber below said bottom wall having heating means therein; means for preventing heated gases from said combustion chamber from flowing along all portions of said rear wall; an impeller within said oven chamber adjacent to said rear wall; means externally of said rear wall coupled to said impeller to rotate the same; a baffle plate adjacent to and forwardly of said impeller and having side portions in closed relation to said side walls, said baffle plate having top and bottom edges spaced from said top and bottom walls, respectively, said plate having a central opening through which air is pulled rearwardly from said oven chamber by said impeller and discharged outwardly by said impeller between said baffle plate and rear wall for return passage around the top and bottom edges of said baffle plate forwardly into said oven chamber; the central portion of said plate surrounding said opening being offset forwardly from the main body portion of said plate, said central offset portion having a diameter substantially conforming to the diameter of said impeller.

6. In a roasting and baking oven food products: a closed oven chamber including top, bottom, side and rear walls; a heating chamber spaced from said top, bottom and side walls, said heating chamber including a combustion chamber below said bottom wall having heating means therein; an impeller within said oven chamber adjacent to said rear wall; means externally of said rear wall coupled to said impeller to rotate the same; a baffle plate adjacent to and forwardly of said impeller and having said portions in closed relation to said side walls, said baffle plate having top and bottom vertical flanges offset forwardly from the main body portion of said plate, said top flange having an upper edge spaced from said top wall and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber; the central portion of said plate surrounding said opening being offset forwardly from the main body portion of said plate, said central offset portion having a diameter substantially conforming to the diameter of said impeller.

7. In a roasting and baking oven for food products: a closed oven chamber including top, bottom, side and rear walls; a heating chamber spaced from said top, bottom and side walls, said heating chamber including a combustion chamber below said bottom wall having heating means therein; an impeller within said oven chamber adjacent to said rear wall; means externally of said rear wall coupled to said impeller to rotate the same; a baffle plate adjacent to and forwardly of said impeller and having side portions in closed relation to said side walls, said baffle plate having top and bottom vertical flanges offset forwardly from the main body portion of said plate, an upper rib inclined in an upward and forward direction and interconnecting said main body portion with the lower end of said top flange, a lower rib inclined in a downward and forward direction interconnecting said main body portion and the upper end of said bottom flange, said top flange having an upper edge spaced from said top wall and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber.

8. In a roasting and baking oven for food products: a closed oven chamber including top, bottom, side and rear walls; a heating chamber spaced from said top, bottom and side walls, said heating chamber including a combustion chamber below said bottom wall having heating means therein; an impeller within said oven chamber adjacent to said rear wall; means externally of said rear wall coupled to said impeller to rotate the same; a baffle plate adjacent to and forwardly of said impeller and having side portions in closed relation to said side walls, said baffle plate having top and bottom vertical flanges offset forwardly from the main body portion of said plate, an upper rib inclined in an upward and forward direction and interconnecting said main body portion with the lower end of said top flange, a lower rib inclined in a downward and forward direction interconnecting said main body portion and the upper end of said bottom flange, said top flange having an upper edge spaced from said top wall and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber; the central portion of said plate surrounding said opening being offset forwardly from the main body portion of said plate, said central offset portion having a diameter substantially conforming to the diameter of said impeller.

9. In a roasting and baking oven for food products: a closed oven chamber including top, bottom, side and rear walls; a heating chamber including top and side walls spaced from said top and side walls, respectively, of said oven chamber and further including a combustion space below said bottom wall communicating with the side spaces between the side walls of said oven chamber and heating chamber; heating means in said combustion space; a baffle member in each of said side spaces inclined in an upward and forward direction, the lower end of each baffle member being located substantially above said bottom wall of said oven chamber and substantially forwardly of said rear wall, the upper end of each baffle member being located substantially below said top oven chamber wall and substantially rearwardly of the forward end of its associated oven chamber side wall; an impeller within said oven chamber adjacent to said rear wall; means externally of said rear wall coupled to said impeller to rotate the same; a baffle plate adjacent to and forwardly of said impeller and having edge portions spaced from adjacent walls of said oven chamber, said plate having a central opening through which air is pulled rearwardly from said oven chamber by said impeller and discharged outwardly by said impeller between said baffle plate and rear wall for return passage around said edge portions forwardly into said oven chamber.

10. In a roasting and baking oven for food products: a closed oven chamber including top, bottom, side and rear walls; a heating chamber including top and side walls spaced from said top and side walls, respectively, of said oven chamber and further including a combustion space below said bottom wall communicating with the side spaces between the side walls of said oven chamber and heating chamber; heating means in said combustion space; means for preventing heated gases from said combustion space from flowing along all portions of said rear wall; a baffle member in each of said spaces inclined in an upward and forward direction, the lower end of each baffle member being located substantially above said bottom wall of said oven chamber and substantially forwardly of said rear wall, the upper end of each baffle member being located substantially below said top oven chamber wall and substantially rearwardly of the forward end of its associated oven chamber side wall; a baffle member in the rear of said combustion space having an upper portion inclined upwardly and forwardly to direct heated gases forwardly and upwardly to said side spaces; an impeller within said oven chamber adjacent to said rear wall; means externally of said rear wall coupled to said impeller to rotate the same; a baffle plate adjacent to and forwardly of said impeller and having edge portions spaced from adjacent walls of said oven chamber, said plate having a central opening through which air is pulled rearwardly from said oven chamber by said impeller and discharged outwardly by said impeller between said baffle plate and rear wall for return passage around said edge portions forwardly into said oven chamber.

11. In a roasting and baking oven for food products: a closed oven chamber including top, bottom, side and rear walls; a heating chamber including top and side walls spaced from said top and side walls, respectively, of said oven chamber and further including a combustion space below said bottom wall communicating with the side spaces betwen the side walls of said oven chamber and heating chamber; heating means in said combustion space; a baffle member in each of said spaces inclined in an upward and forward direction, the lower end of each baffle member being located substantially above said bottom wall of said oven chamber and substantially forwardly of said rear wall, the upper end of each baffle member being located substantially below said top oven chamber wall and substantially rearwardly of the forward end of its associated oven chamber side wall; an impeller within said oven chamber adjacent to said rear wall; means externally of said rear wall coupled to said impeller to rotate the same; a baffle plate adjacent to and forwardly of said impeller and having side portions in closed relation to said side walls of said oven chamber, said baffle plate having top and bottom edges spaced from said top and bottom walls, respectively, of said oven chamber, said plate having a central opening through which air is pulled rearwardly from said oven chamber by said impeller and discharged outwardly by said impeller between said baffle plate and rear wall for return passage around the top and bottom edges of said baffle plate forwardly into said oven chamber.

12. In a roasting and baking oven for food products: a closed oven chamber including top, bottom, side and rear walls; a heating chamber including top and side walls spaced from said top and side walls, respectively, of said oven chamber and further including a combustion space below said bottom wall communicating with the side spaces between the side walls of said oven chamber and heating chamber; heating means in said combustion space; means for preventing heated gases from said combustion space from flowing along all portions of said rear wall; a baffle member in each of said spaces inclined in an upward and forward direction, the lower end of each baffle member being located substantially above said bottom wall of said oven chamber and substantially forwardly of said rear wall, the upper end of each baffle member being located substantially below said top oven chamber wall and substantially rearwardly of the forward end of its associated oven chamber side wall; a baffle member in the rear of said combustion space having an upper portion inclined upwardly and forwardly to direct heated gases forwardly and upwardly to said side spaces; an impeller within said oven chamber adjacent to said rear wall; means externally of said rear wall coupled to said impeller to rotate the same; a baffle plate adjacent to and forwardly of said impeller and having side portions in closed relation to said side walls of said oven chamber, said baffle plate having top and bottom edges spaced from said top and bottom walls, respectively, of said oven chamber, said plate having a central opening through which air is pulled rearwardly from said oven chamber by said impeller and discharged outwardly by said impeller between said baffle plate and rear wall for return passage around the top and bottom edges of said baffle plate forwardly into said oven chamber.

13. In a roasting and baking oven for food products: a closed oven chamber including top, bottom, side and rear walls; a heating chamber including top and side walls spaced from said top and side walls, respectively, of said oven chamber and further including a combustion space below said bottom wall communicating with the side spaces between the side walls of said oven chamber and heating chamber; heating means in said combustion space; a baffle member in each of said spaces inclined in an upward and forward direction, the lower end of each baffle member being located substantially above said bottom wall of said oven chamber and substantially forwardly of said rear wall, the upper end of each baffle member being located substantially below said top oven chamber wall and substantially rearwardly of the forward end of its associated oven chamber side wall; an impeller within said oven chamber adjacent to said rear wall; means externally of said rear wall coupled to said impeller to rotate the same; a baffle plate adjacent to and forwardly of said impeller and having side portions in closed relation to said side walls of said oven chamber, said baffle plate having top and bottom vertical flanges offset forwardly from the main body portion of said plate, said top flange having an upper edge spaced from said top wall of said oven chamber and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber.

14. In a roasting and baking oven for food products: a closed oven chamber including top, bottom, side and rear walls; a heating chamber including top and side walls spaced from said top and side walls, respectively, of said oven chamber and further including a combustion space below said bottom wall communicating with the side spaces between the side walls of said oven chamber and heating chamber; heating means in said combustion space; a baffle member in each of said spaces inclined in an upward and forward direction, the lower end of each baffle member being located substantially above said bottom wall of said oven chamber and substantially forwardly of said rear wall, the upper end of each baffle member being located substantially below said top oven chamber wall and substantially rearwardly of the forward end of its associated oven chamber side wall; an impeller within said oven chamber adjacent to said rear wall; means externally of said rear wall coupled to said impeller to rotate the same; a baffle plate adjacent to and forwardly of said impeller and having side portions in closed relation to the side walls of said oven chamber, said baffle plate having top and bottom vertical flanges offset forwardly from the main body portion of said plate, said top flange having an upper edge spaced from said top wall of said oven chamber and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber; the central portion of said plate surrounding said opening being offset forwardly from the main body portion of said plate, said central offset portion having a diameter substantially conforming to the diameter of said impeller.

15. In a roasting and baking oven for food products: a closed oven chamber including top, bottom, side and rear walls; a heating chamber including top and side walls spaced from said top and side walls, respectively, of said oven chamber and further including a combustion space below said bottom wall communicating with the side spaces between the side walls of said oven chamber and heating chamber; heating means in said combustion space; a baffle member in each of said spaces inclined in an upward and forward direction, the lower end of each baffle member being located substantially above said bottom wall of said oven chamber and substantially forwardly of said rear wall, the upper end of each baffle member being located substantially below said top oven chamber wall and substantially rearwardly of the forward end of its associated oven chamber side wall; an impeller within said oven chamber adjacent to said rear wall; means externally of said rear wall coupled to said impeller to rotate the same; a baffle plate adjacent to and forwardly of said impeller and having side portions in closed relation to said side walls of said oven chamber, said baffle plate having top and bottom vertical flanges offset forwardly from the main body portion of said plate, an upper rib inclined in an upward and forward direction and interconnecting said main body portion with the lower end of said top flange, a lower rib inclined in a downward and forward direction interconnecting said main body portion and the upper end of said bottom flange, said top flange having an upper edge spaced from said top wall of said oven chamber and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber.

16. In a roasting and baking oven for food products: a closed oven chamber including top, bottom, side and rear walls; a heating chamber including top and side walls spaced from said top and side walls, respectively, of said oven chamber and further including a combustion space below said bottom wall communicating with the side spaces between the side walls of said oven chamber and heating chamber; heating means in said combustion space; a baffle member in each of said spaces inclined in an upward and forward direction, the lower end of each baffle member being located substantially above said bottom wall of said oven chamber and substantially forwardly of said rear wall, the upper end of each baffle member being located substantially below said top oven chamber wall and substantially rearwardly of the forward end of its associated oven chamber side wall; an impeller within said oven chamber adjacent to said rear wall; means externally of said rear wall coupled to said impeller to rotate the same; a baffle plate adjacent to and forwardly of said impeller and having side portions in closed relation to said side walls of said oven chamber, said baffle plate having top and bottom vertical flanges offset forwardly from the main body portion of said plate, an upper rib inclined in an upward and forward direction and interconnecting said main body portion with the lower end of said top flange, a lower rib inclined in a downward and forward direction interconnecting said main body portion and the upper end of said bottom flange, said top flange having an upper edge spaced from said top wall of said oven chamber and said bottom flange having a lower edge spaced from said bottom wall, said plate having a central opening through which air is pulled rearwardly from said oven chamber by said impeller and discharged outwardly by said impeller between said plate and rear wall for return passage around said upper and lower edges forwardly into said oven chamber; the central portion of said plate surrounding said opening being offset forwardly from the main body portion of said plate, said central offset portion having a diameter substantially conforming to the diameter of said impeller.

References Cited in the file of this patent
UNITED STATES PATENTS

| | | |
|---|---|---|
| 1,794,151 | Cope | Feb. 24, 1931 |
| 1,880,665 | Barker | Oct. 4, 1932 |
| 2,050,180 | Hurxthal | Aug. 4, 1936 |
| 2,168,028 | Harsch | Aug. 1, 1939 |
| 2,627,265 | Tate | Feb. 3, 1953 |
| 3,074,393 | Keating | Jan. 22, 1963 |